Figure 1:
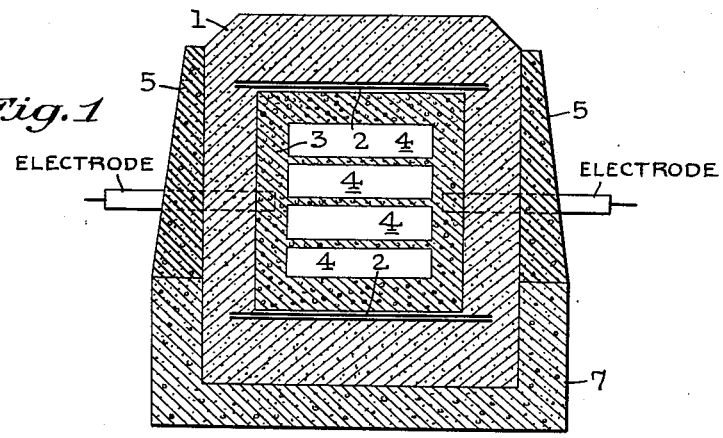

June 21, 1960  A. LEGENDRE ET AL  2,941,866
PROCESS AND APPARATUS FOR PRODUCING PURE GRAPHITE
Filed Feb. 21, 1957

50% CC$_2$F$_2$ + 50% N$_2$

INVENTORS
André Legendre
and Pierre Cornuault
BY
Raphael Turner
Attorney

United States Patent Office 2,941,866
Patented June 21, 1960

2,941,866

PROCESS AND APPARATUS FOR PRODUCING PURE GRAPHITE

André Legendre, Chedde, and Pierre Cornuault, Le Fayet, France, assignors to Pechiney Compagnie de Produits Chimiques et Electrometallurgiques, Paris, France, a corporation of France, and The Commissariat a l'Energie Atomique, Paris, France, jointly Filed Feb. 21, 1957, Ser. No. 641,737

Claims priority, application France Feb. 29, 1956

13 Claims. (Cl. 23—209.3)

The various known processes for purifying graphite generally use a special purification step which is quite distinct from the different production stages employed in manufacturing the product.

As a result of their investigations, applicants have discovered that it is possible to achieve simultaneously the graphitization and purification of the product.

The present invention, which is based on applicants' discovery, relates to a process for the production of pure graphite which leads to a product of a grade suitable for nuclear applications; moreover, the process enables production of pure graphite useful for the construction of nuclear reactors by using as a basic raw material petroleum coke of an ordinary grade, without being forced to use a carbonaceous product selected for its low boron content or one that has been preliminarily purified.

Finally, the purification process of the present invention is not limited to the production of a graphite product having a very low boron content; it also enables the removal of the other impurities contained in the petroleum coke, particularly vanadium.

The process consists in causing halogenated compounds in the gaseous phase to act in the graphitizing furnace itself and, during its operation, under such conditions that the graphitized products are penetrated by a sufficient quantity of purifying vapor when the temperature reaches a point corresponding to a commercially suitable purification rate.

The temperature to which it is desirable to heat the products, the pressure of the purifying vapor and the reaction rate are dependent on the halogenated compound (or compounds) used and on the operating conditions.

Graphite manufacture is generally carried out in resistor furnaces of the type commercially known as the Acheson furnace, in which the products to be graphitized act as the resistor and are surrounded by a thermal insulating mixture having the approximate composition $SiO_2+3C$. This mixture contains appreciable quantities of impurities which are detrimental to graphite. Moreover, the mixture is prone to absorb the halogenated compounds which combine easily with silica.

It might, therefore, seem paradoxical to attempt purification by means of vapors of halogenated compounds in contact with this thermal insulating mixture. Notwithstanding these drawbacks, the process which is the object of the present invention enables the production of very pure graphite under economical conditions.

One of the embodiments of the present invention consists in separating the carbonaceous products to be processed from the thermal insulating mixture layers (of the approximate composition $SiO_2+3C$) by a layer of granular coke not less than 200 mm. thick. There is prevented in this manner the consumption of the halogenated compound (or compounds)—acting as the refining agent—by the thermal insulating mixtures, and the required partial pressure of the purifying vapor is maintained for a sufficient time in the zone of the carbonaceous products to be purified.

The halogenated compounds are used in quantities of 0.5 to 20% by weight of the mass of carbonaceous products to be processed and can be introduced, for example, as follows:

(1) Either into the mass of products to be refined at the time of preparing the paste intended to be extruded or pressed;

(2) Or mixed with the carbonaceous granules or powders used in connecting graphitizing furnaces (for example, the granules used in connecting the resistors of resistance furnaces, or the powders serving as a packing for the products in induction furnaces);

In both of these cases, it is necessary that the halogenated compounds have a vaporization temperature higher than 2000° C.;

(3) Or as beds, consisting of a thin layer of halogenated compounds, placed within coke granules surrounding the products to be treated and at such a distance from the latter that, during heating, the refining agent attains the required vapor pressure at the time when the graphitized masses are at a temperature corresponding to a commercially suitable purification rate;

This arrangement enables the use of halogenated compounds having—under the conditions prevailing in the furnaces—a vaporization temperature appreciably lower than the temperature which the products to be processed must attain in order to achieve an effective purification;

(4) Or else, directly into the resistor when the temperature of the latter is high enough to insure a commercially suitable reaction speed, by means of graphite tubes opening into the resistor, the halogenated compounds being introduced in the solid state (in the form of powder, pellets, solid particles suspended in a gas), or in the liquid or gaseous state.

Another important feature of the invention consists in constructing the furnace in such a manner as to prevent the gaseous streams or vapors coming from the thermal insulating mixtures from entering the zone where the products to be graphitized are located. To this end, the pressure drop relationships in the furnace are established in such a way that the gaseous streams will escape through the side walls without being able to pass through the resistor from bottom to top to an appreciable extent. This result is obtained, for example, by (1) Increasing the height of the insulating mixture above the resistor;

(2) By placing under the resistor a screen made, for example, of one or more sheets of a carbonizable product (several layers of cardboard, sheets of cellulosic fibers bonded together with resin, etc.), or of very finely powdered carbon (coke or graphite);

(3) By providing (forming) exhaust ducts for the gases under the resistor and at the interface between the carbonaceous pellets and the thermal insulating mixtures.

There will now be described, with reference to the annexed diagrammatic Figures 1 to 3 and in a non-limiting way, several examples for carrying out the process of the present invention for producing pure graphite. The arrangements employed for carrying out these embodiments, and which will be described with reference to these examples, must be considered as forming a part of this invention, it being understood that any equivalent arrangement can be used as well, without departing from the scope of the invention.

Figure 2:
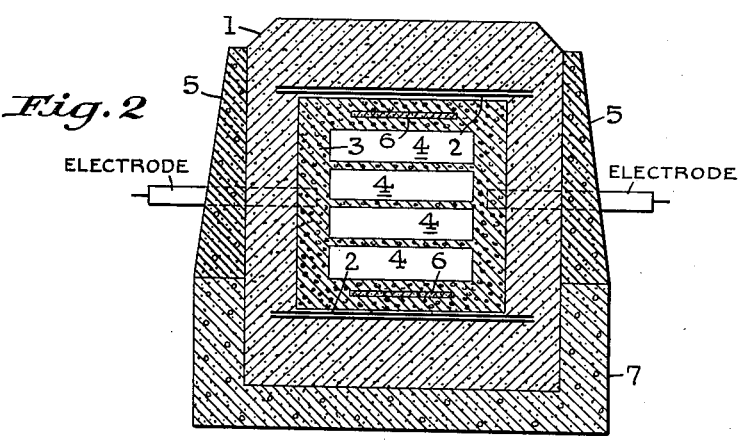
Figure 3:
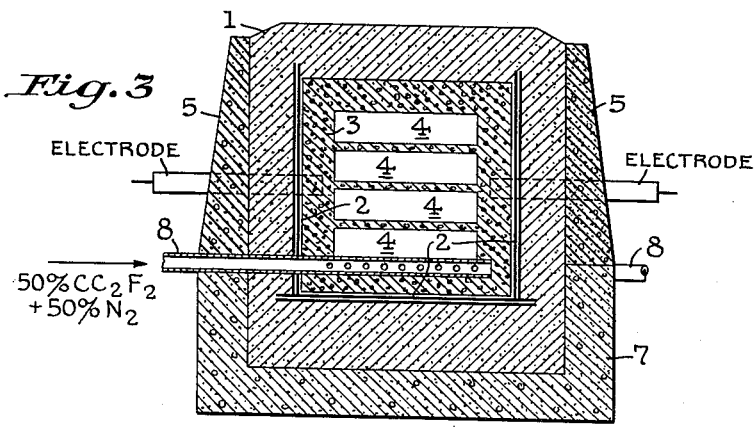

Figures 1 to 3 represent three constructional forms of graphitizing resistor furnaces of the Acheson type, according to the present invention. These figures illustrate sections taken through a plane perpendicular to the largest dimension (length) of the furnace.

In the figures:

1 designates the thermal insulating mixture containing $SiO_2+C+SiC$;

2 represents screens consisting of two or three superimposed sheets of agglomerated cellulosic fibers;

3 is the granulated carbonaceous material surrounding the resistor;

4 is the resistor (zone occupied by the products to be processed);

5 represents removable concrete blocks forming the wall;

7 is the concrete hearth.

Further, 6 in Figure 2 represents beds of sodium fluoride placed in the layer 3 of granulated carbonaceous material, while 8 in Figure 3 designates perforated graphite tubes arranged one meter apart along the furnace, alternately on the right and on the left.

*Example 1*

The carbonaceous products to be processed are obtained by extruding a carbonaceous paste prepared by kneading at 150° C. a mixture of 78 parts petroleum coke, 22 parts coal pitch and 3 parts magnesium fluoride.

These products are then baked at 800° C. in the commonly used baking furnaces.

After having been eventually impregnated with pitch, the products are charged in an electric graphitizing furnace conforming to the one shown in Figure 1.

If a resistance type furnace be used—one consisting of two current inlet heads between which is built up a resistor using the products themselves (about 20 tons), and an insert of a granular carbonaceous product, the resistor being heat-insulated by a mixture of sand and coke having a thickness about 600 mm.—there is formed a sheath 3 of carbonaceous pellets, 300 mm. thick, between the resistor and the heat-insulating mixture.

In addition, there is placed a screen 2 between the separation surfaces of the granules and the upper and lower layers of heat insulating mixture, which screen consists of a carbonizable product such as, for example, several superposed layers of cardboard or several sheets formed of cellulosic fibers bonded together with phenolic resins. A voltage is then applied to the furnace and the power is controlled in such a manner as to obtain, from 1000° C. up, a temperature increase of 50 centigrade degrees per hour until a temperature of 2900° C. is reached in the center of the resistor.

The graphite obtained in this way has a capture cross section for thermal neutrons of 3.8±0.2 millibarns, whereas an identical raw material treated without purifying agents has a much higher cross section, for example, of the order of 5 millibarns.

*Example 2*

The products to be processed are obtained by extruding or pressing a carbonaceous paste prepared by kneading at 150° C. a mixture of 78 parts coke and 22 parts pitch. They are then baked at 800° C., and after having been eventually impregnated with pitch, are charged into graphitizing furnaces such as those described in Example 1 but, in this case, two horizontal beds 6 of sodium fluoride are placed in the casing of carbonaceous granules at distances 200 millimeters above and 200 millimeters below the products to be processed (see Fig. 2).

The quantity of sodium fluoride forming each layer is such that it represents 2.5% of the mass of the products to be processed; the heating of the furnace is carried out as in Example 1.

The graphite obtained in this way has a capture cross section of 3.6±0.2 millibarns.

*Example 3*

The products to be processed, prepared as in Example 2, are charged into a graphitizing furnace in the same way. But, in this case, graphite tubes 8 (Fig. 3) traverse the side layer of heat insulating mixture 3 and permit the injection of a gaseous stream into the resistor. The stream is constituted of a mixture of 50% nitrogen and 50% Freon ($CCl_2F_2$); the gaseous mixture is injected when the temperature of the products is higher than 2000° C. and, at such a rate, that the quantity of Freon injected into the resistor amounts to 1% of the whole product to be processed, the supply being maintained constant for three hours.

In this case, the carbonizable screens 2, separating the layer of granulated carbon from the heat insulating mixture, are placed below and at the lateral faces of the resistor, as shown in Figure 3.

The graphite obtained in this manner has a capture cross section of 3.8±0.2 millibarns.

We claim:

1. Process for graphitizing and purifying in a single operation carbon-containing articles contaminated with impurities to produce highly purified graphite suitable for nuclear applications, comprising the steps: forming an intimate mixture of coke and a binder; forming desired shapes from said mixture; baking the shapes at a temperature of about 800° C.; placing the baked shapes in a graphitizing furnace and surrounding said baked shapes with a heat-insulating mixture susceptible of giving off gases harmful to the articles; separating the baked shapes from the heat insulating mixture by a layer of granular coke; heating the baked shapes in the graphitizing furnace to a graphitizing temperature, and simultaneously subjecting the shapes to the action of halogenated compounds in the vapor phase to produce thereby articles of highly purified graphite, the said layer of granular coke acting thereby as a barrier to advantageously inhibit passage of and detrimental attack by harmful gases, given off by said insulating mixture, on the resultant graphite and, also, to inhibit passage and detrimental combination of the halogenated compounds with said insulating mixture, and additionally interposing separate means above and below the baked shapes to preferentially reduce the resistance to flow of the harmful gases laterally and outwardly, relative to the resistance to flow vertically and inwardly.

2. Process according to claim 1, wherein the articles are subjected to the halogenated compounds at a temperature above 2000° C.

3. Process according to claim 2, wherein the halogenated compound is magnesium fluoride.

4. Process according to claim 2, wherein the halogenated compound is sodium fluoride.

5. Process according to claim 2, wherein the halogenated compound is Freon.

6. Process according to claim 2, wherein the quantity of halogenated compound employed ranges between 0.5 and 20% by weight of the articles to be graphitized.

7. Process according to claim 2, wherein the graphitizing furnace is an electric furnace of the resistor type, and the articles form part of the resistor.

8. Process according to claim 2, wherein the graphitizing furnace is an electric furnace of the resistor type, and the articles form part of the resistor, and wherein the halogenated compound in solid state is disposed outside the resistor and is at least partially volatilized at a temperature below 2000° C., whereby the halogenated compound is vaporized when the articles to be graphitized attain a temperature of 2000° C.

9. Process according to claim 2, wherein the halogenated compound is incorporated in the layer of granular coke.

10. Process according to claim 1, wherein the heat insulating mixture comprises silica and carbon.

11. A furnace for graphitizing carbon articles comprising in combination: a heat insulating casing susceptible of giving off gases harmful to the articles; a resistor surrounded by said casing and comprising the articles to be graphitized; means for supplying current to said resistor; means for supplying a reagent in vapor phase to said resistor; means between the resistor and the casing for preventing flow of gases between the resistor and the casing, and additional means disposed between the casing and the resistor above and below the flow preventing means whereby the resistance to the flow of said gases laterally and outwardly is less than the resistance vertically and inwardly, whereby the gases escape from the furnace without appreciably contacting the articles.

12. Furnace according to claim 11, wherein the additional means is constituted of a screen of carbonizable sheets.

13. The method of forming a charge for a graphitizing furnace wherein baked carbon articles contaminated with impurities are simultaneously graphitized and purified by a reagent in a single operation, comprising the following steps: forming a resistor comprising said articles; disposing a source of reagent adjacent said articles; disposing about said resistor a layer of granular coke, said layer acting as a barrier to the free flow of gases; surrounding said layer with a heat insulating casing susceptible of giving off gases harmful to the articles; and interposing between the casing and the resistor above and below said layer of coke a screen of carbonizable sheets to preferentially reduce the resistance to flow of gases laterally and outwardly relative to the resistance vertically and inwardly.

References Cited in the file of this patent

UNITED STATES PATENTS

| | | |
|---|---|---|
| 702,758 | Acheson | June 17, 1902 |
| 733,389 | Hall | July 14, 1903 |
| 1,030,620 | Sprague et al. | June 25, 1912 |
| 1,357,290 | Kemmer | Nov. 2, 1920 |
| 2,315,346 | Mitchell | Mar. 30, 1943 |
| 2,624,698 | Hickey | Jan. 6, 1953 |
| 2,734,799 | Brooks | Feb. 14, 1956 |
| 2,734,800 | Brooks | Feb. 14, 1956 |
| 2,734,801 | Brooks | Feb. 14, 1956 |
| 2,808,369 | Hickey | Oct. 1, 1957 |
| 2,893,848 | Hamister | July 7, 1959 |